Figure 1:
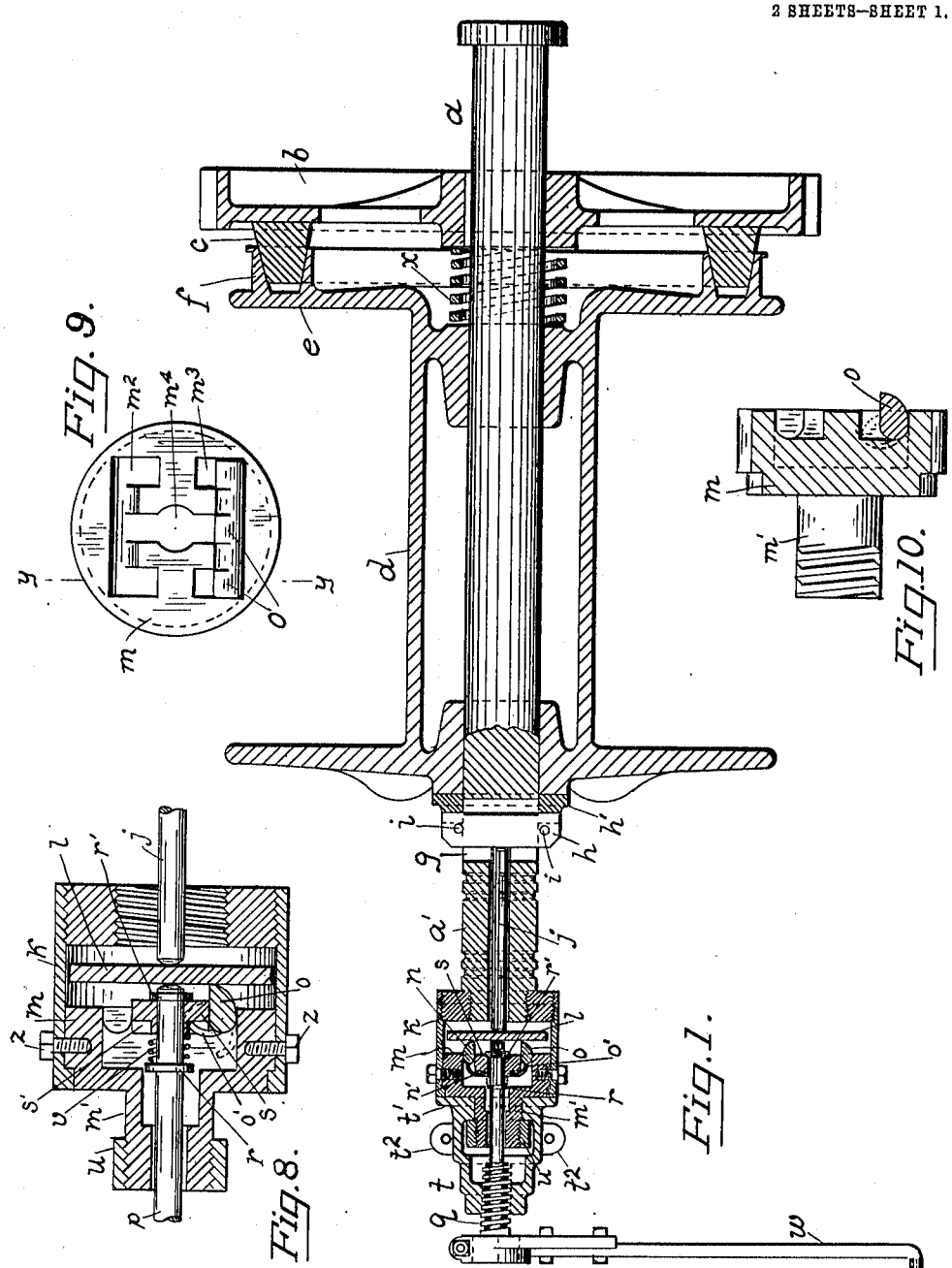

R. C. BRYANT.
FRICTION CLUTCH FOR DRUMS OF DONKEY ENGINES.
APPLICATION FILED SEPT. 20, 1911.
1,096,598.
Patented May 12, 1914.
2 SHEETS—SHEET 2.
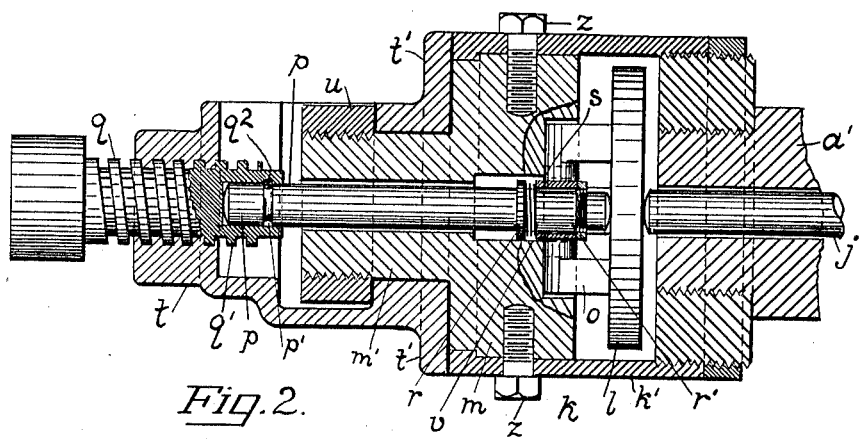
Fig. 2.
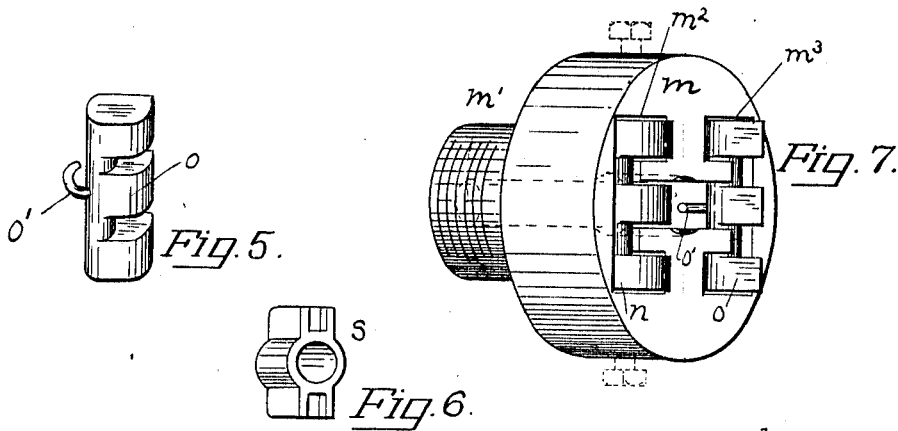
WITNESSES:
Cecil Long
W. Lewis Cook
INVENTOR
Robert C. Bryant
BY J. Geisler
ATTORNEY

UNITED STATES PATENT OFFICE.

ROBERT C. BRYANT, OF CLATSKANIE, OREGON.

FRICTION-CLUTCH FOR DRUMS OF DONKEY-ENGINES.

1,096,598.
Specification of Letters Patent.
Patented May 12, 1914.

Application filed September 20, 1911. Serial No. 650,480.

*To all whom it may concern:*

Be it known that I, ROBERT C. BRYANT, a citizen of the United States, and resident of Clatskanie, Columbia county, State of Oregon, have invented a new and useful Improvement in Friction-Clutches for Drums of Donkey-Engines, of which the following is a specification.

This invention relates to the friction clutch of the transmission mechanism of a hoisting or "donkey" engine and has for its object to provide screw actuated efficient means for setting up the drum against the wooden friction flange of the large gear on the driven shaft, so as to cause the cone flange of the former to engage with the latter when the drum is to be rotated.

My invention also, particularly, has for its purpose to so construct the devices by which the drum is moved into engagement with the large gear that the former will be held in such engagement by automatic locking devices until manually released, so as to avoid the necessity of the operator holding the drum in operative contact with said gear.

My invention further includes the particular features hereinafter fully set forth.

In the drawings: Figure 1 is a plan section showing the driven shaft of the donkey engine and the large gear wheel rigidly mounted thereon and revolving therewith, the drum, and the mechanism invented by me whereby the latter is set against the wooden friction flange on the large gear and is locked in place when so set up; this view also shows the mechanism provided for releasing the drum; Fig. 2 is a vertical, longitudinal sectional detail, on a larger scale, of the devices provided by me for setting up the drum against the friction flange of the large gear; also for locking in place, and releasing it again; Fig. 3 is a diagrammatic top view of a part of the devices included in Fig. 2 and agreeing in scale with the latter. This figure illustrates diagrammatically the position of the parts prior to their operation for moving the drum into operative contact with the friction flange on the large gear of the engine; Fig. 4 shows a part of the devices shown in the preceding figure and illustrates diagrammatically the position of the devices when my device has been operated to throw the drum into operative contact with said friction flange of the large gear; Figs. 5 and 6 are details of construction more fully described in the body of the specification; Fig. 7 is a perspective front view of that portion of my mechanism embodying the means for locking the drum in operative contact with the friction flange of the large gear; Fig. 8 is a longitudinal section of the same mechanism; Fig. 9 is a front view of the head of the box, in which such mechanism is contained, and Fig. 10 is a section on line $y$—$y$ of Fig. 9.

The donkey engine is assumed to be of the common and well known type. For this reason I show only the driven shaft thereof in Fig. 1, designated by $a$. On the shaft is rigidly mounted a large gear wheel, $b$, provided on one face with a laterally projecting wooden annular friction flange, $c$. On the engine shaft, $a$, is loosely mounted a drum, $d$, the head, $e$, of which is provided with an annular cone flange, $f$, in which to receive the friction flange, $c$, of the gear wheel, $b$, when the drum is to be operatively locked with the latter. The shaft, $a$, is provided with a slot, $g$, in which is inserted a bar, $h$, bearing against a washer, $h'$, seated in the hub of the drum; the bar, $h$, being held in place by split-keys inserted in the holes $i$, $i$. The shaft end, $a'$, is provided with a center bore, in which is contained a loose pin, $j$. On the shaft end, $a'$, is threaded a box, $k$, the details of construction of which are readily seen by having reference to Figs. 2, 7 and 8. In the box, $k$, is contained a disk, $l$, and in the head, $m$, of the box $k$, are journaled knuckles, $n$, $o$, a detail of one of which is shown in Fig. 5. The head, $m$, is made with cavities $m^2$ $m^3$ for the knuckles; it is also made with a neck, $m'$, provided with a center bore in which is contained a loose pin, $p$, connected in any convenient manner with one end of the screw, $q$; the neck is also formed with a cavity, $m^4$, for the cross-head, $s$, mounted on the pin, $p$.

As shown in the drawings, the screw end, $q'$, is formed with a socket and an annular groove at $q^2$, in which is placed a ring, seated in the peripheral groove, $p'$, of the pin, $p$, whereby the screw, $q$, is adapted to be rotated on the pin, $p$. The latter is made at its right end, as shown in the drawings with an integral collar, $r$, and a movable collar, $r'$. Between the collars, $r$, $r'$, is a cross-head, $s$, a detail of which is shown in Fig. 6. The cross-head is formed with recesses, $s'$ $s'$. See Figs. 3 and 8. The knuckles, $n$, $o$, journaled in the head $m$, are respectively provided with hooks, $n'$, $o'$, adapted to enter in the recesses, s', of the cross-head, s, when the knuckles, n, o, have been thrown into their locking position, as shown in Fig. 4; and the turning of the screw, q, in the reverse direction will retract the pin, p, turn the knuckles, n, o, on their axles and move them from their locking position as shown in the Fig. 4, into their released position, as shown in Fig. 3. The screw, q, is journaled in a bearing, t, formed with flanges, t', which provide an abutment for the head, m, of the box, k, the latter being rotatably held in place by the collar, u, screwed on the threaded end of the neck, m', of the head, m. Parts illustrated in the drawings but not specifically described are understood to be of any convenient construction.

Between the integral collar, r, of the pin, p, and the cross-head, s, is placed an expansion spring, v, the function of which will be described later. On the screw, q, is fastened a crank handle, w. Between the hub of the large gear b, and the opposite hub of the drum, d, is placed the usual expansion spring, x. The shell, k', of the box, k, is fastened in place on the head, m, by screws, z.

The operation of my device is as follows: Normally, the spring, x, forces the drum, d, out of engagement with the friction flange, c, of the gear, b. By operating the handle, w, so as to drive in the screw, q, the pin, p, is moved into contact with the disk, l, and the latter is thereby brought to bear against the pin, j, which bears against the bar, h, bearing against washer, h', and the hub of the drum; and thus the inward movement of the screw, q, forces the drum, d, into engagement with the friction flange, c, of the gear, b. During such movement of the operative parts the shoulder, r, on the pin, p, causes the knuckles, n, o, to be moved into their locking position, and when fully moved into such position the spring, v, operates to push the cross-head, s, against the collar, r', whereby the cross-head is placed in the position shown in Fig. 4 and serves to block the knuckles, n, o, against return movement, and thus rigidly holds the drum, d, in engagement with the friction flange of the gear wheel, b, without any further attention being required upon the part of the operator. To release the drum, d, the operator turns the handle, w, in the reverse direction, thereby retracting the pin, p, and causing the collar, r', to pull the cross-head, a, from between the knuckles, n, o, and causing the latter to follow the movement of the cross-head, because their hooks, n' o', are engaged with the recessed portions, s' s', of the cross-head, s, as shown in Fig. 4, finally restoring the parts to the position diagrammatically illustrated in Fig. 3. The ears $t^2$, shown in Fig. 1 on the bearing t, are provided as means for fastening said bearing to any convenient support.

I claim:

1. In a hoisting engine of the type described, the combination of a pivoted member; means including a manually operated power for turning said pivoted member on its axis; means between such pivoted member and the drum of the engine adapted to move and hold the drum in operating position by said pivoted member; and spring-actuated means for locking the pivoted member in place, thereby holding the drum in operating position, such means being included in said means for rotating the pivoted member.

2. In a hoisting engine of the type described, the combination of two pivoted members; means between such pivoted members and the drum of the engine adapted to move and hold the drum in operating position by said pivoted members; manually operable means comprising a movable block adapted to engage and rotate said pivoted members and to be projected therebetween in its extreme position; and automatic means for projecting said block between pivoted members, whereby the latter are locked against reverse rotation until the retraction of said block.

3. In a hoisting engine of the type described, the combination of two pivoted members; means between such pivoted members and the drum of the engine adapted to move and hold the drum in operating position by said pivoted members; screw actuated means comprising a movable block adapted to engage and rotate said pivoted members and to be projected therebetween in its extreme position; and automatic means for projecting said block between the pivoted members, whereby the latter are locked against reverse rotation until the retraction of said block.

4. In a hoisting engine of the type described, the combination of two pivoted members; means between such pivoted members and the drum of the engine, adapted to move and hold the drum in operating position by said pivoted members; manually operable means comprising a movable block, adapted to engage and rotate said pivoted members and to be projected therebetween in its extreme position; and a spring adapted to project said block past the axial centers of the pivoted members when the latter have been placed in their extreme positions, thereby locking the pivoted members against reverse rotation until the retraction of said block.

5. In a hoisting engine of the type described, the combination of a shaft made with an inner end extension; a longitudinally movable member supported by such inner end extension, the outer end of said longitudinal member bearing against the drum of the engine; a box on such inner-end extension of the shaft; a disk in such box bearing against the inner end of said longitudinal movable member; a longitudinally movable pin bearing against the opposite face of the disk; a pair of knuckles, journaled in the box, positioned to be projected against said disk; adapted for longitudinally moving the said longitudinally movable member; a cross-head longitudinally movable on the extremity of the pin; an abutment on the pin limiting the outward movement of the cross-head, a second abutment on the pin on the opposite side of the cross-head, a coil spring between said second abutment and the cross-head; said cross-head operating to rotate the knuckles outward; said spring being adapted to project the cross-head between the knuckles when the latter have been turned outward to such degree as to permit the cross-head to pass their axial centers, whereby the knuckles are locked against reverse rotation; and means for causing the knuckles to be reversely rotated by the retraction of the cross-head, the parts being arranged to cause the retraction of the latter before the knuckles are rotated.

6. In a hoisting engine of the type described, the combination of a shaft made with an inner end extension; a longitudinally movable member supported by such inner end extension, the outer end of said longitudinal member bearing against the drum of the engine; a box on such inner-end extension of the shaft; a disk in such box bearing against the inner end of said longitudinal movable member; a longitudinally movable pin bearing against the opposite face of the disk; a pair of knuckles, journaled in the box, positioned to be projected against said disk; a screw element adapted for longitudinally moving the pin; a cross-head longitudinally movable on the extremity of the pin; an abutment on the pin limiting the outward movement of the cross-head, a second abutment on the pin on the opposite side of the cross-head, a coil spring between said second abutment and the cross-head; said cross-head operating to rotate the knuckles outward; said spring being adapted to project the cross-head between the knuckles when the latter have been turned outward to such degree as to permit the cross-head to pass their axial centers, whereby the knuckles are locked against reverse rotation; and means for causing the knuckles to be reversely rotated by the retraction of the cross-head, the parts being arranged to cause the retraction of the latter before the knuckles are rotated.

ROBERT C. BRYANT.

Witnesses:
T. J. GEISLER,
W. LEWIS COOP.

---

Copies of this patent may be obtained for five cents each, by addressing the "Commissioner of Patents, Washington, D. C."